United States Patent [19]

Contre et al.

[11] 4,265,666
[45] May 5, 1981

[54] BORON CARBIDE LA, SR AND/OR BA HEXABORIDE CERAMIC MATERIAL FOR A LOW TEMPERATURE DIRECT HEATING ELECTRIC GUN CATHODE

[75] Inventors: Michel Contré, Verriere-le-Buisson; Philippe Martin, Orsay; Monique Quetier, Paris, all of France

[73] Assignee: Commissariat A'Ernergie Atomique, Paris, France

[21] Appl. No.: 67,365

[22] Filed: Aug. 17, 1979

[30] Foreign Application Priority Data

Aug. 18, 1978 [FR] France ................ 78 24109

[51] Int. Cl.³ ............ C04B 35/52; C04B 35/58; C04B 35/50
[52] U.S. Cl. .................. 106/43; 106/73.2
[58] Field of Search ............. 106/43, 55, 73.2; 252/516

[56] References Cited

U.S. PATENT DOCUMENTS

| 2,647,061 | 7/1953 | Lowe | 106/43 |
| 3,730,826 | 5/1973 | Matchen et al. | 106/43 |

Primary Examiner—Earl C. Thomas
Assistant Examiner—Mark Bell

[57] ABSTRACT

Ceramic material for a low temperature direct heating electron gun cathode, wherein it is constituted by a mixed ceramic material of a hexaboride of a refractory material consisting of at least one substance with a high emissive power from the group consisting of La, Sr, and Ba hexaborides and a conductive material, boron carbide, having a resistivity higher than that of an emissive substance, the structure of the ceramic material resulting from its production by cofritting of the said components.

2 Claims, 1 Drawing Figure

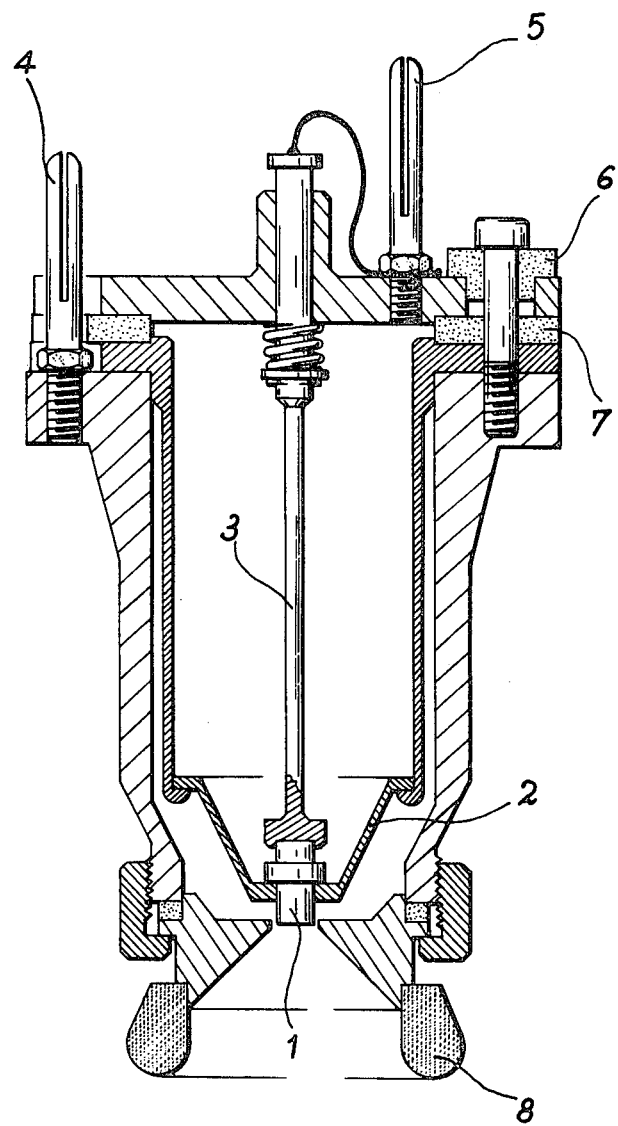

BORON CARBIDE LA, SR AND/OR BA HEXABORIDE CERAMIC MATERIAL FOR A LOW TEMPERATURE DIRECT HEATING ELECTRIC GUN CATHODE

BACKGROUND OF THE INVENTION

The present invention relates to a ceramic material which can be used for making the emission cathode of an electron gun of the low temperature direct heating type.

Cathodes of electron guns have to produce a high flow rate and generally function by thermoelectronic action. The materials used must satisfy a number of requirements, i.e.:

supply a high current at the operating temperature, which presupposes a high emissivity and a low work function, have a low evaporation rate at the operating temperature, have a sufficiently good hot mechanical property for the emission cathode to have a good geometrical stability so that the gun has very constant characteristics.

Among the materials which meet these requirements, there are metals (tantalum, tungsten) which are generally used at temperatures of about 2450° C. (giving the saturation current of 1A /cm$^{-2}$ for tantalum). In 1951 Lafferty (J. of Appl. Phys. 22, No. 3, pp.299-309) showed that certain borides of rare earth could also be used. An example is lanthanum hexaboride which has an emissivity of 29A/cm$^{-2}$/°K.$^{-1}$ and a work function of 2.66e.v, an emission of 1A/cm$^{-2}$ being obtained at 1700° K.

Metal cathodes can be heated indirectly (by electron bombardment) or directly by the Joule effect. In the latter case, the metals are used as very thin sections (approximately 1/10 mm) in sheet or ribbon form and this makes it necessary for them to have a sufficiently high resistivity to permit their correct heating.

Rare earth borides cannot be obtained for such a form, because they are essentially produced by fritting. Hitherto, they have been produced in pellet form and have been heated indirectly.

A cathode is already known which uses indirect heating of a rare earth boride by contact with a pyrrolitic graphite resistor. This possibility is interesting but suffers from the disadvantage of requiring the use of minuscule pieces of graphite, which may prove difficult to use.

Moreover, the thermal and electrical contact between resistor and cathode can deteriorate during successive disassembly and reassembly operations. Nevertheless, this method has the advantage of permitting the use of solid hexaboride without electron bombardment being necessary.

Thus, high power industrial electron guns, used particularly for welding purposes, require the following properties from their cathode:

a high geometrical stability, so that solid materials are preferred, a minimum thermal dissipation which prevents the appearance of undesired expansion of certain parts of the gun, so that materials with a low emission temperature are preferred, possibility of direct heating by Joule effect permitting a simplification of the generators associated with the guns and their supply cables.

In connection with the first two points, rare earth borides are preferred against metals. However, the third point favours metals due to the low resistivity of rare earth borides (15µΩ at 20° C.) associated with the impossibility of using them industrially, other than in the form of fritted products. For all these reasons, it has not hitherto proved possible to industrially use rare earth borides for producing emission cathodes of electron guns.

BRIEF SUMMARY OF THE INVENTION

The present invention relates to a ceramic material for a solid cathode able to operate at low temperature (1700° to 1800° K.), which can be heated directly and utilises the intersecting properties of borides of refractory materials having a high emission power and in particular of rare earths.

This ceramic material is constituted by a mixed ceramic material of a hexaboride of a refractory material consisting of at least one substance with a high emission power and a conductive material having a resistivity higher than that of the emissive substance, the structure of the ceramic material resulting from its production by cofritting of said components.

Thus, the ceramic material according to the invention contains both hexaboride particles of materials used for the emission of electrons and particles of a traditional conductive substance, but which has a higher resistivity than that of the emission material and which is preferably boron carbide, constituting a matrix permitting the heating of the complete material by Joule effect.

The additional substance associated with the hexaboride must satisfy the following requirements:

a resistivity of appropriate value for direct heating by the Joule effect, can be cofitted with lanthanum hexaboride or other substances with a high emissive power, a low chemical reactivity with the hexaboride of rare earth or other substances with a high emissive power at the emission temperature, i.e. it must be boron-saturated.

It is important that the boron, whose diffusion capacity is well known, does not pass from the hexaboride to the resistive matrix, otherwise this would lead to a reduction in the emission characteristics of the hexaboride.

Within the scope of the present invention, it has been shown that such a cathode can be obtained by cofritting lanthanum hexaboride, for example with boron carbide.

According to the invention, the refractory material having a high emissive power in hexaboride form is preferably chosen from the group containing lanthanum, strontium and barium.

It is of interest to point out that in the case of barium, the emissive power is 16A/cm$^{-2}$/°K./$^{-1}$ and that the work function is 3.45 eV. The corresponding values for strontium are 0.14 A/cm$^{-2}$/°K.$^{-1}$ and 2.67 eV. Moreover, it is known that for example mixtures of lanthanum and hexaboride and strontium hexaboride have an emissive power which can be at least equal to that of pure materials used.

DESCRIPTION OF DRAWING AND PREFERRED EMBODIMENTS

The invention will be better understood from the following description of a number of examples of ceramic materials according to the invention, with reference to the attached drawing which shows in a nonlimitative manner a possible assembly of a ceramic material cathode in an electron gun.

The following description relates to lanthanum, but good results can also be obtained by using as the refractory materials with a high emissive power barium or strontium or mixtures of two of these materials.

The cathodes for electron guns have been produced from the three following compositions having been based on lanthanum hexaboride and boron carbide. The compositions given in the following Table are compositions by volume. The fritting operation took place at a temperature of 2040° C. and lasted about 1 hour for each example.

The choice of the grain sizes of the powders forming the mixture and the physical fritting conditions make it possible to obtain, as required, a desired degree of homogeneity with the final mixed ceramic material.

TABLE

| $LaB_6$ | $B_4C$ | Fritted product density | Resistivity $\Omega$/cm |
|---------|--------|-------------------------|-------------------------|
| 10%     | 90%    | 2.10                    | 1.57                    |
|         |        | 2.00                    | 1.57                    |
| 20%     | 80%    | 2.37                    | 0.066                   |
|         |        | 2.25                    | 0.066                   |
| 50%     | 50%    | 3.11                    | 0.023                   |
|         |        | 3.18                    | 0.023                   |

Cathodes made from the materials described in the above Table can be machined (using a grinder), heated by the direct passage of current and can emit electrons with a density of approximately 1A/cm$^2$ in the case of the third example (50% $LaB_6$). For an emission surface of about 10 mm$^2$ it has been found that the heating power remains below 200 W at the emission temperature of 1420° C.

It is important to note that with these compositions the emissivity varies in a linear manner with the lanthanum content.

The tests related to parts containing various lanthanum hexaboride and boron carbide proportions, the lanthanum hexaboride content varying between 10 and 80%.

$LaB_6$ contents below 30% only have a limited interest because the emissivity which is proportional to this content becomes too low and leads to cathodes with a prohibitive surface area.

To obtain the necessary heating resistance, the $B_4C$ content must be sufficient to ensure that the resistivity of the mixed ceramic material, which varies as a function of this content as has been shown in the Table, is at least equal to 0.02$\Omega$/cm. Under these conditions, the preferred $LaB_6$ content is between 30 and 50%.

In general terms, the volume proportion of hexaboride of refractory material with a high emissive power is between 10 and 70%. It is also preferred, as illustrated in the preceding examples, for this content to be between 30 and 50%.

The attached drawings show a possible use of the ceramic material according to the invention in an electron gun cathode. This drawing shows the cathode 1 made from the ceramic material according to the invention which is a small cylinder of diameter equal to 3.5 mm, machined with a grinder from a bar obtained by fritting. Cathode 1 has a shoulder. It is energised by two contacts constituted in one case by a tantalum cone 2 and in the other case by a tantalum conductor 3, which are respectively supplied by supply terminals 4 and 5 of the cathode. In the present embodiment, terminals 4 and 5 are insulated by per se known insulators 6 and 7.

Cathode 1 is centered in the focusing electrode or Wehnelt grid 8 of the electron gun and the complete apparatus shown in the drawing is brought to a negative high voltage with respect to an anode connected to earth and not shown in the drawing. The electrical resistance of the apparatus in the drawing is 0.060 hm at 1420° C. and at this temperature the material constituting the cathode emits electrons in a space charge regime with a current density of 1A/cm$^2$. A current intensity of 100 mA is obtained with a 30 kV power supply.

Thus, the cathode is indeed a solid cathode operating at a relatively low temperature and heated directly. In this connection, it has all the requirements to permit its industrial use, particularly in electron beam welding where, as is known, the emission cathode must have a particularly long service life.

What is claimed is:

1. A ceramic material for a low temperature direct heating electron gun cathode consisting essentially of boron carbide and at least one hexaboride selected from the group consisting of the hexaborides of of lanthanum, strontium and barium, and mixtures thereof, said ceramic material being produced by co-fritting the aforesaid components at an elevated temperature for a time and in the proportions sufficient to result in a product having a proportion of hexaboride of from about 10% to 70% by volume thereof.

2. A ceramic material according to claim 1, wherein the resulting product has a proportion of hexaboride from about 30% to 50% by volume thereof.

* * * * *